Sept. 20, 1960　　　　　R. WUNDERLICH　　　　2,953,726
APPARATUS FOR PRODUCING A MECHANICAL MOVEMENT
DEPENDING UPON THE OSCILLATORY MOTION
OF A VIBRATING MEMBER
Filed Oct. 16, 1957　　　　　　　　　　　　4 Sheets-Sheet 1
FIG. 1
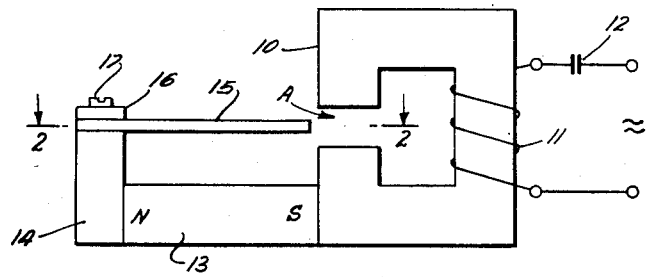
FIG. 2
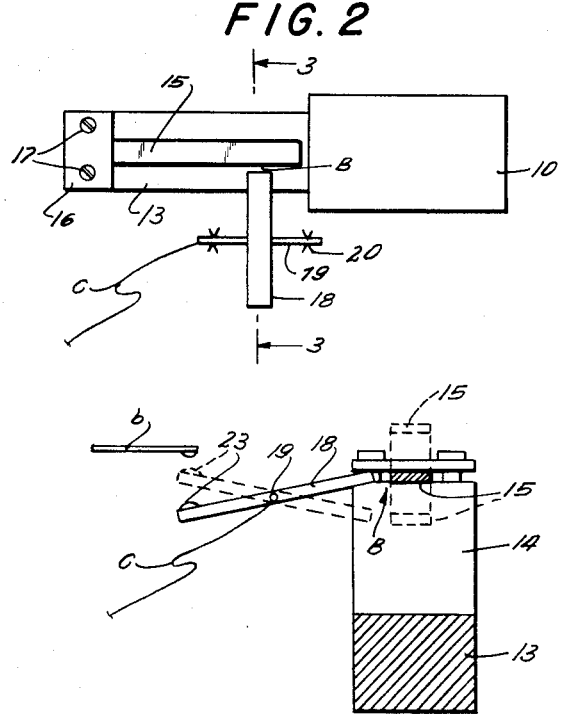
FIG. 3
INVENTOR.
Raffael Wunderlich
BY
Michael S. Striker
Attorney

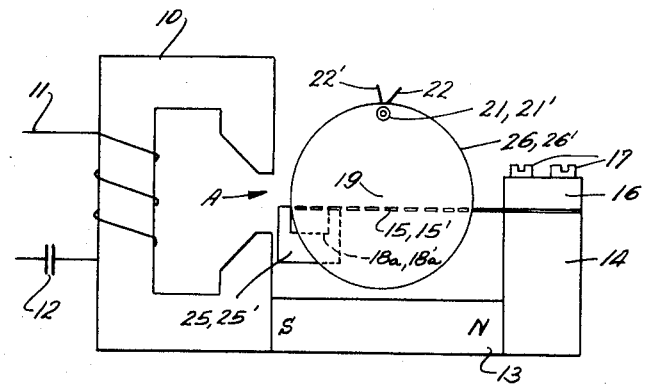
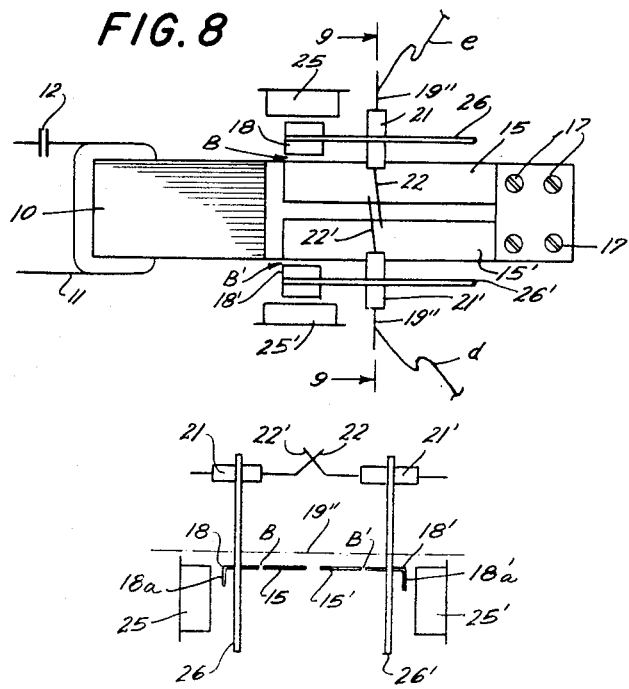

United States Patent Office 2,953,726
Patented Sept. 20, 1960

2,953,726

APPARATUS FOR PRODUCING A MECHANICAL MOVEMENT DEPENDING UPON THE OSCILLATORY MOTION OF A VIBRATING MEMBER

Raffael Wunderlich, Munich, Germany
(Staufenstrasse 22, Frankfurt am Main, Germany)

Filed Oct. 16, 1957, Ser. No. 690,579

Claims priority, application Germany Oct. 18, 1956

21 Claims. (Cl. 317—123)

The present invention concerns chiefly an apparatus for producing a mechanical movement depending upon the amplitude of the oscillatory motion of a mechanical vibrating member such as in a resonance receiver device having mechanical vibrating members of this type wherein the vibration of a mechanically oscillatable element influences across an auxiliary air gap a detector member which is movable in the direction of the vibration that is to be responded to by said detector member.

More specifically, the invention concerns an arrangement for receiving the vibratory signal and for moving a mechanical member depending upon the vibration of another member and upon the amplitude thereof caused by the reception of said vibratory signal.

Particularly in the field of resonance receiver devices it is known to derive from an oscillatable member which is vibrated by an incoming signal, the movement of some mechanical part usually for the purpose of closing the contacts of an electrical circuit. However, the known arrangements of this type are not satisfactory for several reasons. In some cases the cooperating parts are subject to considerable wear so that reliable performance cannot be expected from the particular device. In most cases, the movement of the secondary member derived from the vibration of the primary vibrating element is only adapted to indicate whether any vibratory signal has been received by the device. However, the secondary element is not adapted to carry out a movement to a degree or extent which is in a predetermined ratio or proportion with respect to the amplitude of the vibration of the primary element at any given moment.

It is, therefore, a main object of this invention to provide for an arrangement which would avoid the deficiencies of the known systems.

It is another object of this invention to provide for an arrangement which is adapted to produce in a device or arrangement of the types set forth a movement of a detector which is a definite function of the amplitude of the primary mechanical vibrating member and which follows this amplitude with a continuous characteristic.

Considering that the detector member is subject to a force exerted by the primary vibrating member upon said detector member across an auxiliary air gap, the present invention provides for exposing said detector member to the influence of an additional magnetic force acting in the desired direction of movement of the detector member, the two forces having respective directions and magnitudes adapted to cause the detector member to move into an indicating position and, after its movement away from its normal position, to return to that normal position, the inertia of said detector member being so chosen that it is capable of following even rapid changes of the amplitude of the sequence of oscillations of the primary vibrating member to be responded to by the detector member, but is incapable to follow the individual oscillations of that primary mechanical vibrating member.

With these objects in view, basically an arrangement according to the invention for receiving a vibratory signal and for moving a mechanical member depending upon the vibration of another member and upon the amplitude thereof caused by the reception of said vibratory signal, comprises, in combination, an elongated permanent magnet; an elongated oscillatable member of magnetic material and tuned to a predetermined resonance frequency related to that of the signal, wherein one end of this oscillatable member is fixedly attached to one pole of the permanent magnet while the other pole of the permanent magnet is located opposite the oscillatable member. An elongated detector member of magnetic material is pivotally mounted adjacent through the oscillatable member for turning movement about an axis substantially parallel with said oscillatable member and in such a manner that in its normal position one end of the detector member is spaced by a narrow air gap from the free end of the oscillatable member. Consequently, when the oscillatable member vibrates with a certain amplitude, the detector member is moved from its normal position into a position determined by the actual amplitude of the vibration of the oscillatable member at the given moment.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1 is a diagrammatic elevation of a resonance receiver;

Figure 2 is a diagrammatic plan view of the device of Figure 1, essentially as seen in the plane 2—2 of Figure 1, but including a detector device according to the invention;

Figure 3 is a cross-sectional view of the device illustrated by Figure 2, the section being taken along line 3—3 of Figure 2;

Figure 7 is a diagrammatic elevation of a further development of the device according to Figure 1 or Figure 4;

Figure 8 is a diagrammatic plan view of the device illustrated by Figure 7; and

Figure 9 is a diagrammatic cross-sectional view of the same device the section being taken along lines 9—9 of Figure 8.

Figure 4:
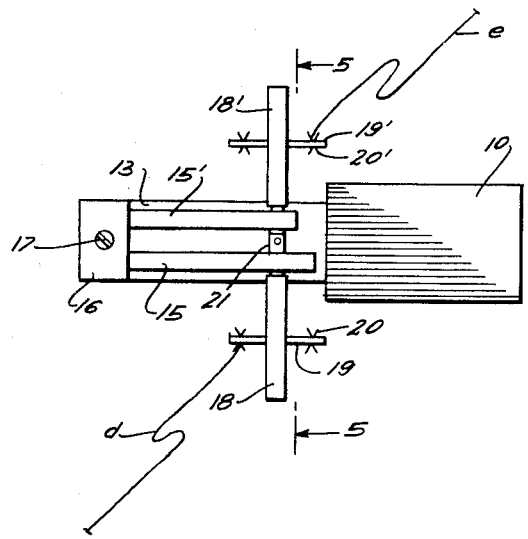
Figure 4 is a plan view similar to Figure 2, illustrating an arrangement with two primary vibrators and two corresponding detector members.

Figure 1, by way of example illustrates the arrangement of a resonance receiver device which in this particular case is actuated electrically. A soft iron core 10, composed for example of laminations of armature metal, carries the coil 11 which is supplied with the signal alternating current. It is advisable to connect a condenser 12 in series with the coil 11 so that these two elements constitute in a well known manner a series resonance circuit which is tuned and adjusted to the frequency of the signal potential. The main air gap A divides the core 10 into two legs. Whenever an A.C. is fed into the coil 11 at the predetermined signal frequency, a particularly strong alternating magnetic field is set up across the main air gap A.

An elongated permanent magnet 13 is, with one of its poles, for instance with the pole S, in direct magnetically conductive contact with one of the legs of the soft iron core 10, while its opposite pole N is remote from the core 10 and is provided with a pole piece 14. This pole piece 14 carries an oscillatable element 15 which is arranged so that in a position of rest its free end extends toward the main air gap A and is located substantially in a plane which is indicated by the line 2—2 and passes through the center of the air gap A. The oscillatable member 15 is fixedly attached to the pole piece 14 by means of a pressure plate 16 and screws 17. The oscillatable member 15 is tuned to a resonance frequency equal to that of the signal to be received. In accordance with known principles the permanent magnet 13 creates in the main air gap A a magnetic bias potential through the pole piece 14, the oscillatable member 15 and the adjacent lower leg of the soft iron core 10. Consequently, the oscillatable member 15 is bound to vibrate at a frequency which is exactly identical with that of the signal received.

As can be seen from Figure 2, in accordance with the invention a detector member 18 made of magnetic material is being used in combination with the resonance receiver described above. In this example the detector member has the form of an elongated bar or strip and is pivotally mounted in such a manner that in its normal position one of its ends is located adjacent to the vibrating member 15 and so that it is capable of carrying out a movement which is directed in the same direction as the vibration of the member 15. For this purpose the detector member 18 is, for instance, supported with an axle 19 in bearings 20 so that the axis of turning is substantially parallel with the length of the member 15. In order to render the whole device independent of positions or orientation with respect to gravity, it is advisable, to arrange matters so that the axis of rotation, i.e., the axis of the axle 19 passes through the center of gravity of the detector member 18. Moreover, in order to obtain a great sensitivity of the device it is advisable to arrange the detector member 18 in the immediate neighborhood of the free end of the oscillatable member 15. In the interest of good efficiency the size of the secondary or auxiliary air gap B between the free ends of the members 15 and 18 should be made small, for instance in a magnitude of .5 mm. It has been found also that it is of advantage if the axis of the axle 19 is located beneath the plane indicated by the line 2—2 of Figure 1, that is, spaced from said plane 2—2 in the direction towards the permanent magnet 13, as can be seen clearly from Figure 3.

Figure 3 illustrates the operation of the arrangement. As long as no signal voltage is applied to the coil 11, the oscillatable member 15 is in its normal position of rest indicated in the drawing in full lines. Under this condition the detector member 18 occupies likewise the normal position shown in full lines in the drawing. As soon as the coil 11 is supplied with the signal voltage, the oscillatable element 15 is caused to carry out vibrations the amplitude whereof depends upon the actual signal potential. For example, at a certain signal potential the vibrating member 15 will occupy, at maximum deflection, the amplitude positions indicated in broken lines in Figure 3. In the presence of the permanent and alternating magnetic fields, mutually superimposed upon each other, the detector member 18 is caused under these circumstances to move from its former position into the position shown in broken lines in Figure 3 toward the vicinity of the lower leg of core 10, i.e. toward pole S. In this position the free end of the member 18 is oriented substantially towards that point which is occupied by the opposed free end portion of the member 15 at the instant of maximum deflection thereof. The reason for this performance is explained at the end of this specification.

As the amplitude of the vibration of the member 15 possibly changes with a variation of the signal potential, the amount of turn of the member 18 will change accordingly. Therefore the movement of the member 18 is clearly a definite function of the amplitude of the oscillatable member 15 and, consequently, a function of the signal potential applied to the coil 11. The turning movement of the detector member 18 may be used in various ways. For instance the member 18 may be provided with a contact 23 which logically will move along a circular path the axis of which is the axis of the axle 19. A part of an electric circuit $c$ may be connected with this axle 19 and one or more, fixed or adjustable contacts $b$ may be arranged in the path of the contact 23 so that at a predetermined amount of turning motion of the member 18 a circuit $b$—$c$ may be closed. In another instance, the member 18 may be connected to a recording device which then would directly record the amplitudes of the vibration of the oscillatable member 15. Finally the detector member 18 may be coupled with a follower transmitter which may serve to transmit data, impulses or other values which correspond to the amplitude of the vibration of the oscillatable member 15.

Figure 5:
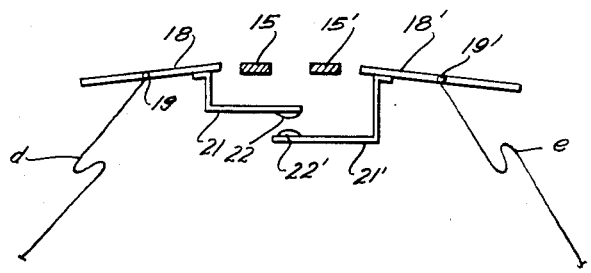
Figure 5 is a fragmentary cross-sectional view of the arrangement of Figure 4, the section being taken along lines 5—5 of Figure 4.

In the embodiment of the invention illustrated by Figures 4 and 5, two separate but similar oscillatable members 15 and 15' are used, each of them being associated with a separate detector member 18 and 18', respectively. The oscillatable member 15 is tuned to the frequency of the signal to be received, while the oscillatable member 15' is tuned to a different frequency adjacent to the signal frequency in the frequency band. This arrangement makes it possible to eliminate the effect of undesirable interfering or disturbing signals which may appear simultaneously with the main signal. For this purpose the detector members 18 and 18' carry according to Figure 5 contact arms 21 and 21', respectively which are provided at their free ends with contacts 22 and 22', respectively. The contact arms 21 and 21' are made of non-magnetic material and are shaped in such a manner that the individual contacts 22 and 22' are located, in normal position one above the other and spaced from each other a certain distance. The effect of this arrangement is the following: when only the main signal is received, the oscillatable member 15 only is excited to vibrate whereby the associated detector member 18 is moved while the other detector member 18' remains in its position of rest. Consequently, the detector member 18 turns with its forward end downwardly so that its contact 22 abuts against the contact 22'. Assuming that the axles 19 and 19', respectively, are connected with electrical leads $d$ and $e$ respectively a circuit containing the lead $d$, member 18, arm 21, contacts 22, 22', arm 21', member 18' and lead $e$ would be closed in such a moment. If only a disturbing or interfering signal is received, for instance due to a voltage impulse caused by a switch operation in some outside circuit, such a signal consisting, as is known, of a more or less wide frequency band, then both the members 15 and 15', being tuned to two neighboring frequencies, are excited simultaneously and equally. Consequently both the detector members 18 and 18' are equally turned out of their normal position so that the corresponding contacts 22 and 22' are likewise moved through a distance or an angle of the same magnitude so that no abutment of one contact against the other takes place. Therefore, the disturbing or interfering signal remains without any effect. However, in case a disturbing signal arrives together with the main signal and is superimposed upon the other then the amplitude of the oscillatable member 15 is correspondingly increased so that the turning movement of the detector member 18 is greater than that of the detector member 18'. Due to this difference in movement of the detector members the circuit is again closed due to the contacts 22 and 22' meeting each other. It can be seen that in this manner with the arrangement described even in the case of the arrival of disturbance or interference signals the main signal still causes a reliable closing of the circuit, unless the disturbing signal is so strong that the vibration of the members 15, 15' is simply limited by the magnitude of the air gap A. In this case the two contacts would not be able to meet each other.

Figure 6:
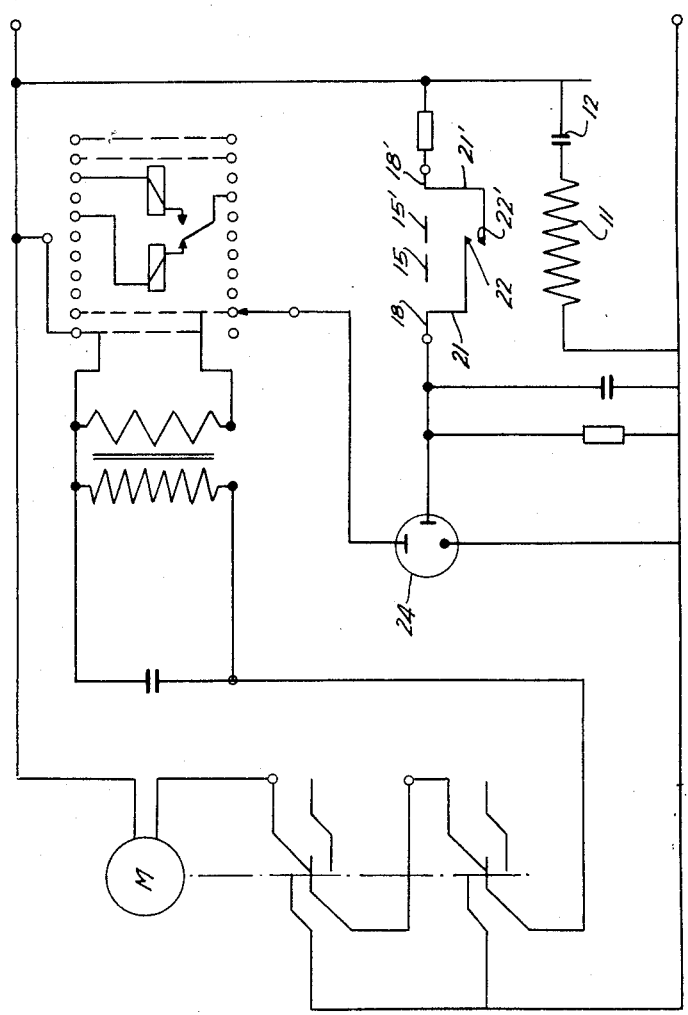
Figure 6 is a circuit diagram concerning a remote control receiver device which incorporates the resonance receiver device according to the invention.

Figure 6 illustrates diagrammatically the circuits of a remote control receiver which incorporates the resonance receiver according to the invention. This diagram incorporates the resonance receiver arrangement according to the embodiment illustrated by Figures 4 and 5. It can be seen that the circuit closed by the contacts 22 and 22' meeting each other is used for igniting a cold cathode tube 24 which is supplied by alternating current and serves to carry out other control operations in the whole arrangement.

It will be understood that the vibration of the oscillatable member 15 or 15' does not have to be caused by electro-magnetic means. It is also possible to cause the vibration of the oscillatable members purely mechanically, for instance by means of acoustical pressure waves or by the vibrations of a body. The operation of the detector member and arrangement according to the invention is not affected hereby. The detector arrangement according to the invention can be used successfully wherever it is desired to convert a mechanical vibration into a continuous movement which is a definite function of the amplitude of that mechanical vibration.

It should be understood that in the above described arrangements the oscillatable member and the detector member are coupled magnetically. It is advisable that the portions of the oscillatable member and of the detector member, respectively, which are opposite each other across the auxiliary air gap B (Figures 2 and 3) are provided with clearly defined pole faces the dimension whereof in the direction of the vibration to be detected should be comparatively small with reference to the amplitude of the vibration to be detected. In order to establish a condition under which the turning movement of the detector member is a definite function of the amplitude of the vibration of the oscillatable member the additional force set up to act upon the detector member is provided in such a manner that this force either remains constant during the movement of the detector member, or that it varies as a function of this turning movement.

In case a mechanical vibration is the source of the signal to be responded to, a transfer of this mechanical vibration to the oscillatable member may be effected by means of mechanical coupling means. If, however, an electrical oscillation is to be responded to then the transfer thereof to the oscillatable member may be carried out either electro-magnetically, as described above with reference to examples, by means of a coil, or it may be done electrostatically by means of a condenser. In all cases, preferably the mechanical oscillatable member is chosen to be coordinated with one or more reasonance frequencies which are located within the resonance range of the electrical oscillation that is to be responded to. I have found that the detector member always moves into a position which is definitely determined by the amplitude of the oscillatable member at the given moment. For instance, in a most elementary case, the movement of the detector member is in proportion with the said amplitude, or in other words, a linear function of that amplitude. For the purpose of explanation one could consider the operation of the detector member mentioned above as constituting a sort of magneto-mechanical rectification of the vibration of the oscillatable member. If one compares this sort of rectification with the operation of a regular electrical rectifier then the amplitude of the vibration of the oscillatable member in our case would correspond to the amplitude of the electrical alternating voltage in the electrical case, while the deflection or movement of the detector member would correspond to the voltage of the rectified electrical A.C. potential.

The movement or deflection of the detector member may be utilized for closing contacts in which case the arrangement can be such that a definite closing of a circuit is obtained at a predetermined amplitude of the vibration of the oscillatable member, and it is to be noted that this circuit remains closed without interruption as long as the particular predetermined amplitude does not change and even if the amplitude of said vibration increases beyond said predetermined amplitude the circuit remains closed. The movement or deflection of the detector member may also be used advantageously for controlling the follower devices or servomotors, as indicated in Fig. 6, or directly for recording the peaks of the vibration amplitudes. In addition the method and arrangement according to the invention may be used advantageously in all those cases where it is desired to cause the movement of a mechanical member in function of the amplitude of a vibration or oscillation, a definite relation being established between said movement and said amplitude.

It should be noted that the devices according to the invention are comparatively simple and inexpensive to manufacture because only rather simple components are required which do not call for extreme precision. Moreover the devices do not contain elements which are exposed to continuous mechanical movement and therefore to an unavoidable wear. The devices according to the invention operate also at comparatively low frequencies without any trouble, these low frequencies may be of a magnitude of 175 c.p.s.

It has been found however that the effective output of the detector member can be increased very considerably if both the force exerted by the oscillatable member on the detector member across the auxiliary air gap B and the additional force which is exerted on the detector member in the desired direction of movement of the latter are simultaneously reinforced or amplified. According to the present invention this can be accomplished by arranging adjacent to the detector member on the side remote from the oscillatable member, an auxiliary magnet having flat-faced poles, the one pole thereof closest to the detector member having a polarity opposed to that of the associated oscillatable member (as determined by the magnet 13), and the center of said pole being so located that this pole creates a force component which acts on the detector member in the said desired direction of movement of the latter.

This auxiliary magnet, on one hand, amplifies or increases the magnetic force exerted by the oscillatable member on the detector member across the auxiliary air gap B, and, on the other hand, creates on account of its location an additional force acting in the direction towards the center of the pole of this magnet, which is in the desired direction of the movement of the detector member. Moreover it has been found that the effect of the auxiliary magnet can be still more increased by increasing the area of the detector member which faces the auxiliary magnet. This can be accomplished according to the invention for instance by forming the detector member mainly of two portions extending at right angles to each other and arranged in such a manner that the free end edge of the detector member is located opposite the lateral edge of the oscillatable member and spaced therefrom by a narrow air gap, while the face of the other portion of the detector member is located opposite the flat face pole of the auxiliary magnet. It is also possible to increase the force exerted on the detector member in the desired direction of movement by providing one or several springs. Should it be found desirable or sufficient, then in certain cases the entire force acting on the detector member in the direction of this desired movement may be created mechanically, for instance by means of springs.

In view of the fact that there is a certain similarity between magnetic and electrostatic attractive forces as far as their effects are concerned, the forces acting on the detector member may be generated electrostatically instead of magnetically. For amplifying or increasing such forces auxiliary magnets mentioned above would have to be replaced by correspondingly polarized electrical charge carriers.

An example of an arrangement of this particular type is illustrated by Figures 7, 8 and 9.

While in this example in a manner similar to the example illustrated by Figures 4 and 5, two oscillatable members and two detector mmebers are provided simultaneously it should be understood that this arrangement can be used as well as with a single oscillatable member and single detector member corresponding to the basic arrangement illustrated by Figures 1, 2, 3.

The arrangement of the permanent magnet, the oscillatable members and of the electron-magnetic means for imparting vibration to the oscillatable members are exactly the same as those described with reference to Figures 4 and 5, and the numerals applied to the various parts of the illustrations likewise the same so that a description in detail does not appear to be necessary.

However, it should be noted that in this case the two detector members 18 and 18' are formed with a second portion 18a and 18a', respectively, which extends at right angles to the other portion thereof. Preferably, the detector members are formed by bending from magnetic strip material. This L-shaped strip is so arranged that the free end edge of the main portion is just opposite the lateral edge of the corresponding oscillatable member 15, 15', respectively, while being spaced therefrom by a narrow auxiliary air gap B, B', respectively. Each of the detector members 18, 18' is carried by an associated carrier element 26, 26', respectively, which is preferably constructed as a disc substantially concentric with an axis of rotation 19" about which the disc 26, 26', respectively, is turnable. The axis 19" extends, for each disc 26, 26', at substantially right angles to the length of the associated oscillatable member 15, 15', respectively, or in other words parallel with the edges thereof clamped by the clamping plate 16 to the pole piece 14. It can be seen also that the axis line 19" is spaced from the general plane of the oscillatable members 15, 15', which usually are constructed as blade springs. The axis line 19" is spaced from said plane in a direction opposite to the direction of movement as desired for the above mentioned detector members. The spacing and location of the axis line 19" with respect to the oscillatable members 15, 15' is chosen in such a manner that at maximal deflection or curvature of any one of the two blade springs 15, 15', respectively, a plane extending tangentially to the curvature at the free end of the particular member 15, 15' near air gap B, B' respectively, coincides approximately with the axis 19".

Each of the detector members 18, 18' is associated with an auxiliary magnet 25, 25', respectively, located adjacent thereto. These magnets have flat-face poles. One of said poles is located opposite the face of the second portion 18a, 18a', respectively, of the associated L-shaped detector member. That pole of the auxiliary magnet 25, 25' respectively, which faces the portions 18a, 18a', respectively, has a polarity opposite to that of the oscillatable members 15, 15', respectively (as determined by the magnet 13). Moreover, the center of this magnet pole is so located that this pole face creates a force component which acts on the detector member in the desired direction of the movement of the latter. Due to this arrangement of the auxiliary magnet, on one hand, the magnetic force exerted by the oscillatable member 15, 15', respectively, on the associated detector member 18, 18', respectively, across the auxiliary air gap B, B', respectively, is amplified, on the other hand, an additional force is exerted on the detector member in the direction towards the center of the particular pole, that is, in the desired direction of the movement of the particular detector member.

Each of the disc-shaped carrier elements 26, 26' is provided with contact means including contact holders 21, 21', respectively, and contacts 22, 22', respectively. The arrangement is such that when the two carrier elements 26, 26' and therefore the two detector members 18, 18', respectively are in their normal position of rest, the contacts 22 and 22' are spaced from each other a predetermined distance so that only when the rotating movement of the carrier elements 26, 26' differs in its extent a predetermined amount corresponding to said spacing, only then the two contacts 22, 22' can meet and close a circuit.

The oscillatable member 15 is tuned to a resonance frequency identical with the frequency of the signal to be received, while the oscillatable member 15' is tuned to a neighboring frequency. Preferably the two neighboring resonance frequencies of the members 15, 15', which are preferably leaf springs, are within the resonance range of the resonance circuit formed by the coil 11 and the condenser 12. This particular arrangement makes it possible to eliminate undesired disturbing signals that may appear simultaneously with the main signal. As long as only the main signal is received, only the oscillatable member 15 will be excited to vibrate and it will then cause the detector member 18 to move while the detector member 18' remains in its position of rest. In this case the detector member 18 moves downwardly and thereby turns the carrier element 26 so that the contact 22 carried by the latter meets the contact 22' of the other carrier element 26'. However, if a disturbing or interfering signal should appear, for instance due to a voltage impulse caused by a switching operation and which, as is known, consists of a more or less wide frequency band, then both the oscillatable members 15 and 15' being tuned to neighboring resonance frequencies, are equally and simultaneously caused to vibrate. Consequently an equal movement of the two detector members 18 and 18' takes place whereby the contacts 22 and 22' are both moved a distance of equal magnitude so that no meeting of these contacts takes place and no circuit is closed. If however a main signal is superimposed to said disturbing signal then the amplitude of the oscillatable member 15 is increased so that the movement of the detector member 18 is larger than the movement of the detector member 18'. This means that in this case the two contacts 22 and 22' meet with each other also and are thereby able to close a circuit. It is assumed for this example that circuit means e and d are connected to the axis means 19 of the two carrier elements 26, 26', respectively, so that a corresponding circuit is closed whenever the two contacts 22, 22' are caused to touch each other.

It can be seen therefore that even in the case of the appearance of a disturbing signal a reliable closing of a circuit is obtained due to the effect of the main signal, provided that the interfering or disturbing signal is not so strong that a limitation of the amplitude of vibration of the oscillatable members is imposed by the magnitude of the main air gap A. If this should occur then the two contacts do not meet with each other.

It is to be understood that in the resonance receiver arrangement described above it is possible to eliminate a zero indication by introducing abutment means which limit the movement of the detector member or members mechanically in such a manner that the position of rest of these detector members corresponds to a position otherwise reached only after the particular detector member has been moved a predetermined amount corresponding to a predetermined amplitude of the corresponding oscillatable member. In other words the detector member will start its movement only after the amplitude of the corresponding oscillatable member has reached a predetermined amount.

It appears advisable to describe now in certain details the actual operation of the arrangement according to the invention. Reference is had particularly to Figure 3.

As long as the oscillatable member 15 is in its normal position of rest, it attracts with its magnetic forces the free end of the detector member 18 and thereby causes the latter to establish for itself also a normal position of rest in which the existing auxiliary air gap B between said two members has its minimum dimension. This situation is illustrated in Figure 3 in full lines. When however the oscillatable member 15 is caused to vibrate, by any means applied thereto, for instance electro-magnetically by exciting the coil 11 with A.C. voltage, then, in the first instance, the detector member 18 adjusts itself to the path of the magnetic lines of force forming loops from the permanent pole S of magnet 13 through the free end of member 15 and across gap B through member 18, and also forming loops from the lower leg pole of core 10, magnetically connected to 13, through member 15, across gap B and through member 18. Therefore, the detector member moves from its position of rest in the direction toward pole 5 of magnet 13, in the direction of the downward amplitude of the vibratory motion of the oscillatable member, but not in the opposite direction, particularly because the magnetic field acting in the gap B becomes much more intensive as the free end of member 15 approaches the pole S. Inertia tends to prevent the member 18 from following rapid movements of member 15, but considering the movement of the vibrating oscillatable member passing by the free end of the detector member 18, it is evident that the velocity of the movement of the oscillating member 15 is at a minimum where it dwells relatively the longest period during its movement, i.e. at the extreme point of its amplitude. If the auxiliary air gap B and the main air gap A are dimensioned properly the detector member will therefore follow the amplitude of the vibrating oscillatable member up to the peak of the amplitude of the latter and, with sufficient inertia with respect to the movements of the vibrating oscillatable member, the detector element will stabilize itself and assume a steady position opposite the point of the peak of amplitude of the vibrating oscillatable member.

It will be understood that each of the elements described above, or two or more together, may also find a useful application in other types of resonance frequency receivers differing from the types described above.

While the invention has been illustrated and described as embodied in an arrangement for receiving a vibratory signal and for moving a mechanical member depending upon that signal, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An arrangement for receiving a vibratory signal and for moving a mechanical member depending upon the vibration of another member and upon the amplitude thereof caused by the reception of said vibratory signal, comprising, in combination, permanent magnet means; an oscillatable member of magnetic material and tuned to a predetermined resonance frequency related to that of said signal, one end thereof being fixedly attached to one pole of said permanent magnet means while the other pole of said permanent magnet means is located opposite the free end of said oscillatable member and spaced therefrom by an air gap; and an elongated detector member of magnetic material mounted adjacent to said free end of said oscillatable member and having at least one portion movable in a direction substantially parallel with the oscillatory movement of said oscillatable member, one end of said portion of said detector member being spaced by a narrow auxiliary air gap from said free end of said oscillatable member when the latter is in its position of rest for being magnetically coupled therewith, whereby when said oscillatable member vibrates, said movable portion of said detector member is moved by magnetic coupling from a normal position determined by the position of rest of said oscillatable member into a displaced position determined by the amplitude of the vibration of said free end of said oscillatable member at the given moment.

2. An arrangement as set forth in claim 1, wherein said detector member is turnably mounted, the axis of the turning movement of said detector member passing through the center of gravity thereof, so that the influence of gravity upon movements of said detector member is eliminated.

3. An arrangement as set forth in claim 2, wherein said axis is located in a plane parallel with a second plane extending at right angles to the direction of oscillation of either member and passing said free end of said oscillatable member when in its position of rest, the plane of said turning axis being, however, spaced from said second plane in direction towards said permanent magnet.

4. An arrangement as set forth in claim 2, including movable electrical contact means carried by said detector member so as to move therewith along a circular path when said detector member is moved turningly about its axis; stationary contact means located in said path at a predetermined distance from the position of said movable contact means; determined by the normal position of said detector member and circuit means connected to said movable and stationary contacts, respectively so that at a predetermined amplitude of the oscillation of said oscillatable member a circuit is closed by the meeting of said contacts.

5. An arrangement as set forth in claim 4, wherein said oscillatable member is a leaf spring.

6. An arrangement for receiving a vibratory signal and for moving a mechanical member depending upon the vibration of another member and upon the amplitude thereof caused by the reception of said vibratory signal, comprising, in combination, an elongated permanent magnet means; a first and a second elongated oscillatable member of magnetic material and tuned, respectively, to different predetermined resonance frequencies related to that of said signal, one end of each of said oscillatable members being fixedly attached to one pole of said permanent magnet means while the other pole of said permanent magnet means is located opposite the free ends of said oscillatable members and spaced therefrom by an air gap; and a first and a second elongated detector member of magnetic material, each of said detector members being associated with one of said first and second oscillatable members, respectively, and pivotally mounted adjacent to said free end of its associated oscillatable member for turning movement about an axis substantially parallel with the length of the associated elongated oscillatable member, one end of each of said detector members being spaced by a narrow air gap from the free end of its associated oscillatable member when the latter is in its position of rest for being magnetically coupled therewith, whereby when any one of said oscillatable members vibrates with a certain amplitude, the detector member associated therewith is moved by magnetic coupling from its normal position determined by the position of rest of said oscillatable member into a displaced position determined by the actual amplitude of the vibration of the free end of the particular oscillatable member at the given moment.

7. An arrangement as set forth in claim 6, including first contact means carried by said first detector member, and second contact means carried by said second detector member, each of said contact means moving with its detector member, when the latter is moved turningly about its axis, along a circular path intersecting that of the other contact means, said first and second contact means being spaced from each other a predetermined distance when both said detector members are in their respective normal positions, but meeting with each other when one of said detector members is moved from its normal position more than the other detector member, the difference of movement being a predetermined amount, and circuit means connected to said first and second detector member so that due to meeting of said first and second contact means a circuit is closed whenever the difference between the vibration amplitudes of said two oscillatable members, respectively, is of a predetermined magnitude.

8. An arrangement as set forth in claim 1, wherein those portions of said oscillatable member and of said detector member, respectively, which are located opposite each other across said narrow auxiliary air gap, are provided with definite pole faces, the pole face areas extending in the direction of the vibration a distance comparatively small relative to the magnitude of the amplitude to be responded to.

9. An arrangement as set forth in claim 1, including means for keeping the magnetic force exerted by said permanent magnet means upon said detector member constant during the turning movement of the latter.

10. An arrangement as set forth in claim 1, including means for making the magnetic force exerted by said permanent magnet means upon said detector member during the movement of the latter a function of said movement.

11. An arrangement as set forth in claim 1, including electromagnetic means for imparting a signal vibration of said oscillatable member.

12. An arrangement as set forth in claim 11, including a soft iron core abutting against said other pole of said permanent magnet means, said core being formed with a main air gap located opposite said free end of said oscillatable member, said oscillatable member when in normal position, extending substantially in direction towards the center of said main air gap, and a coil wound around said core for electromagnetically imparting vibration to said oscillatable member upon the application of an alternating signal potential to said coil.

13. An arrangement as set forth in claim 12, including a condenser connected in series with said coil so as to form a resonance circuit, said oscillatable member being a blade spring tuned to a resonance frequency being within the range of the resonance frequency of said resonance circuit.

14. An arrangement as set forth in claim 12, wherein the free end of said oscillatable member is located sufficiently close to said main air gap to limit by the width of said main air gap the amplitudes of the vibration of said oscillatable member in case of application of a signal potential otherwise tending to impart vibrations to said oscillatable member exceeding such limitation.

15. An arrangement as set forth in claim 1, including abutment means located in the path of movement of said portion of said detector member for defining a position of rest thereof which corresponds to a predetermined amplitude of the vibration of said oscillatable member and from which the latter is free to move towards a position corresponding to a larger than said predetermined amplitude, whereby said detector member is prevented from returning into a zero position corresponding to the normal position of said oscillatable member.

16. An arrangement for receiving a vibratory signal and for moving a mechanical member depending upon the vibration of another member and upon the amplitude thereof caused by the reception of said vibratory signal, comprising, in combination, an elongated permanent magnet means; an elongated oscillatable member of magnetic material and tuned to a predetermined resonance frequency related to that of said signal, one end thereof being fixedly attached to one pole of said permanent magnet means for vibration in a predetermined direction while the other pole of said permanent magnet means is located opposite the free end of said oscillatable member and spaced therefrom by an air gap; a detector member of magnetic material pivotally mounted adjacent to said oscillatable member for turning movement in a plane substantially parallel with the plane of the vibration of said oscillatable member, said detector member being spaced by a narrow auxiliary air gap from said oscillatable member when the latter is in its position of rest, for being magnetically coupled therewith; an auxiliary magnet having flat-face poles and located adjacent to said detector member on the side thereof remote from said oscillatable member, the pole of said auxiliary magnet closest to said detector member having a polarity opposite to that of said oscillatable member as determined by said permanent magnet, and the center of said pole of said auxiliary magnet being located in such a manner that it produces a force component acting on said detector member in the direction of the desired movement thereof, whereby when said oscillatable member vibrates said detector member is moved by magnetic coupling from its normal position determined by the position of rest of said oscillatable member into a displaced position determined by the amplitude of the vibration of said free end of said oscillatable member at the given moment.

17. An arrangement as set forth in claim 16, wherein said detector member comprises two elongated portions extending at right angles to each other, the free end edge of one of said portions being located opposite a lateral edge of said oscillatable member and spaced therefrom by a narrow auxiliary air gap while the face of the other one of said two portions is located opposite the face of said pole of said auxiliary magnet.

18. An arrangement as set forth in claim 17 including a rotatable carrier element carrying said detector member and being pivotally mounted for turning movement about an axis perpendicular to the length of said oscillatable member and to said predetermined direction of vibration, said axis being located at a distance from the general plane of said oscillatable member defined by the normal position of the latter, and on that side of said plane which is opposite to the desired direction of movement of said detector member, in such a manner that at maximum deflection of said oscillatable member a plane tangential to the curvature of the free end of the deflected oscillatable member substantially coincides with said axis, said carrier element being equipped with contact means for closing a circuit when said carrier element is moved a predetermined distance from its normal position.

19. An arrangement as set forth in claim 18 wherein said oscillatable member is a blade spring and wherein said carrier element is formed as a disc substantially concentric with said axis.

20. An arrangement for receiving a vibratory signal and for moving a mechanical member depending upon the vibration of another member and upon the amplitude thereof caused by the reception of said vibratory signal, comprising, in combination, an elongated permanent magnet means; a first and a second elongated oscillatable member of magnetic material and tuned, respectively, to different predetermined resonance frequencies related to that of said signal, one end of each of said oscillatable members being fixedly attached to one pole of said permanent magnet means for vibration in a predetermined direction while the other pole of said permanent magnet means is located opposite the free ends of said oscillatable members and spaced therefrom by an air gap; a first and a second detector member of magnetic material, each of said detector members being associated with one of said first and second oscillatable members and pivotally mounted adjacent to its associated oscillatable member for turning movement in a plane substantially parallel with the plane of the vibration of said associated oscillatable member, each of said detector members being spaced by a narrow auxiliary air gap from said associated oscillatable member when the latter is in its position of rest, for being magnetically coupled therewith; a first and a second auxiliary magnet, each of said auxiliary magnets having flat-face poles and being located adjacent to one of said detector members associated therewith on the side thereof remote from the associated oscillatable member, the pole of each of said auxiliary magnets closest to the associated detector member having a polarity opposite to that of the associated oscillatable member as determined by said permanent magnet, and the center of said pole of each of said auxiliary magnets being located in such a manner that it produces a force component acting on the associated detector member in the direction of the desired movement thereof; first and second rotatable carrier elements respectively associated with said first and second oscillatable members, each of said carrier elements carrying one of said detector members and being pivotally mounted for turning movement about an axis perpendicular to the length of its associated oscillatable member and to said predetermined direction of vibration; first and second contact means carried respectively by said first and second rotatable carrier elements for movement, when the pertaining carrier element is turned, along circular paths which coincide at least over a portion of their lengths, said first and second contact means being so located that they are spaced from each other a predetermined distance when both said first and second rotatable carrier elements are in their normal positions determined by the position of rest of the associated oscillatable member, but meet with each other when one of said carrier elements is turned more than the other carrier element, the difference of turn being equal to said predetermined distance, and circuit means connected to said contacts, whereby when any one of said oscillatable members vibrates, the detector member associated therewith is moved by magnetic coupling from its normal position into a displaced position determined by the amplitude of the vibration of the particular oscillatable member at the given moment, and in the case of a difference between the movements of said detector members equal to said predetermined distance a circuit is closed by said contact means meeting with each other.

21. An arrangement as set forth in claim 20 including electromagnetic means for imparting vibration to said oscillatable members, said electromagnetic means being adjusted to a predetermined resonance frequency corresponding to the signal to be received, said oscillatable members being tuned respectively to two resonance frequencies adjacent to each other and within the range of said predetermined resonance frequency of said electromagnetic means.

References Cited in the file of this patent
UNITED STATES PATENTS 1,585,508    Oliver _____ May 18, 1926